Figure 1:
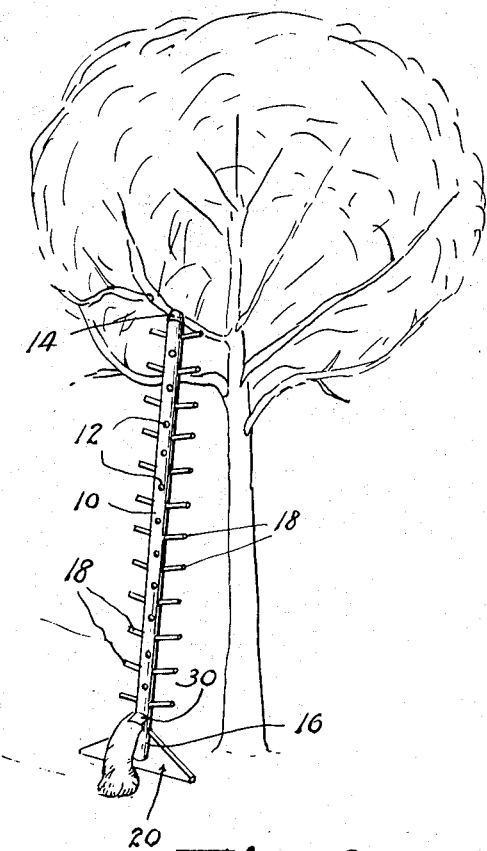

April 17, 1956　　　J. P. MAXWELL　　　2,742,217
FRUIT HARVESTING LADDER
Filed Feb. 27, 1952

J. P. Maxwell　INVENTOR

BY *C. A. Snow & Co.*
ATTORNEYS

United States Patent Office 2,742,217
Patented Apr. 17, 1956

2,742,217

FRUIT HARVESTING LADDER

Jay P. Maxwell, Washington, D. C.

Application February 27, 1952, Serial No. 273,641

2 Claims. (Cl. 228—34)

This invention relates to a fruit harvesting ladder and more particularly to a ladder adapted for use in orchards and the like.

The primary object of the invention is to facilitate the picking of fruit and the transfer of the fruit so picked to a suitable container for subsequent transportation or storage.

Still another object is to facilitate the positioning of the ladder against a tree branch and to avoid as far as possible the entanglement of the upper end of the ladder with branches and foliage.

A still further object is to prevent bruising or injuring the fruit during its transfer from the location at which it is picked to the container in which it is subsequently received.

The above and other objects may be attained by employing this invention which embodies among its features an elongated tubular column having a longitudinal row of longitudinally spaced ports extending therethrough, a convolute baffle carried by said column within the interior thereof, said baffle having the spaces between the convolutions thereof in registration with the ports, and rungs carried by and extending outwardly from the column to support a fruit picker on the column in a position to deposit fruit onto the baffle through the ports.

Other features include a foot carried by the column adjacent one end thereof and having a sharpened lower edge for engagement with the ground when the ladder is in use, and a hollow frusto-conical tip carried by the column adjacent the opposite end thereof to facilitate the projection of the column into a tree between the branches thereof, and a fruit discharge spout carried by the column adjacent the foot through which fruit deposited on the baffle is discharged into a receptacle for subsequent transportation and storage.

Other features include a cushion carried by the baffle and by the inner walls of the column to protect from bruises fruit deposited on the baffle and contacting the inner walls of the column.

Figure 2:
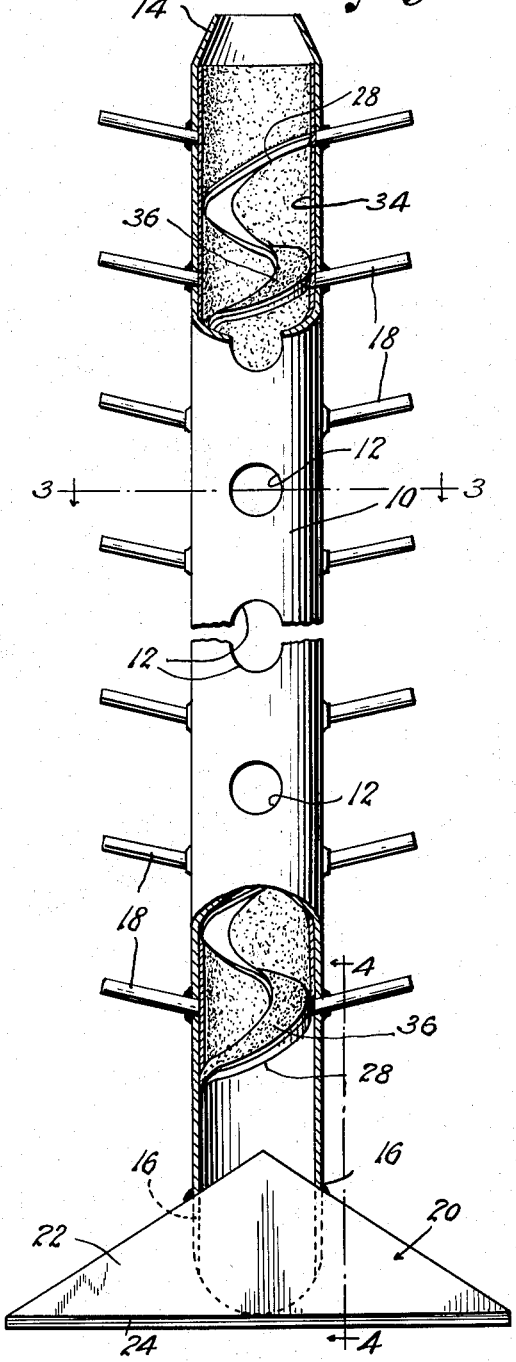
Figure 3:
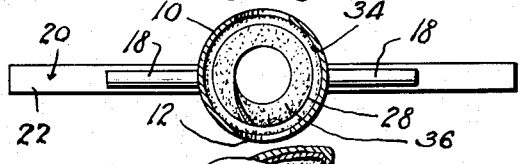
Figure 4:
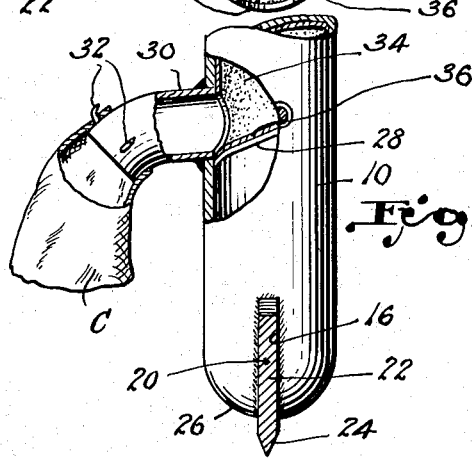

In the drawings,

Fig. 1 is a perspective view of a fruit picking ladder embodying the features of this invention showing its manner of use, Fig. 2 is an enlarged fragmentary longitudinal sectional view through the ladder, Fig. 3 is a horizontal sectional view taken substantially along the line 3—3 of Fig. 2, and Fig. 4 is a sectional view taken substantially along the line 4—4 of Fig. 2 showing portions of the column broken away more clearly to illustrate certain details of construction.

Referring to the drawings in detail, this improved ladder comprises an elongated tubular column 10 which is provided with a longitudinal row of longitudinally spaced ports 12 through which fruit being picked is introduced into the interior of the column. Carried by one end of the column is a hollow frusto-conical tip 14 which facilitates the passage of the column between the branches and foliage of a tree during the positioning of the ladder in fruit picking position. Formed in the end of the column remote from the frusto-conical tip are aligned slots 16 for a purpose to be more fully hereinafter described.

Carried by and extending outwardly from the column 10 intermediate the ports 12 and lying along axes which intersect the axis of the column 10 and perpendicular to the axes of the ports 12 are oppositely extending rungs 18 which as illustrated in Fig. 2 preferably extend angularly toward the frusto-conical tip as they recede from the column in order that the foot of the user resting on a rung will be held from slipping during the picking of the fruit. A foot 20 comprising a substantially triangular plate 22 is entered into the slots 16 and extends outwardly therefrom in longitudinal alignment with the rungs 18 in order to lend stability to the ladder when in use. In the preferred form of the invention the edge of the plate 22 remote from the column 10 is sharpened as at 24 so that when the ladder is in use it will bite into the surface of the ground and prevent slippage of the lower end of the ladder. As shown in Fig. 4, the lower end of the column is turned inwardly as at 26 and the plate 22 is welded or otherwise rigidly fixed to the column.

Carried by and extending longitudinally through the column 10 is a convolute baffle 28, the face of each convolution of which adjacent the frusto-conical tip 14 lies substantially flush with the edge of each opening or port 12 adjacent the foot 20. It will thus be seen that fruit entered into a port may be deposited on the baffle to roll spirally down the baffle within the column toward the foot 20. Carried by and extending outwardly from the column 10 in registration with the lowermost port 12 therein is a discharge spout 30, the end of which remote from the column is turned away from the frusto-conical tip 14 and carries adjacent its end outwardly extending hooks 32 by means of which a suitable container C may be engaged with the discharge spout 30 so that fruit passing through the discharge spout will be deposited in the container. In the preferred form of the invention, the interior of the column 10 is lined with a suitable cushioning material 34 and likewise the sides of the convolutions of the baffle which face the frusto-conical tip 14 are covered with a suitable cushioning material 36 which will serve to prevent injury to fruit passing through the column.

While as previously described the edges of the ports 12 lie substantially flush with the sides of the convolutions of the baffle 28 which face the frusto-conical tip 14, it is to be understood that in some instances it may be desirable to space the ports a short distance from the convolutions so as to prevent fruit passing down the column from rolling out through ports above the discharge port of the column.

In use the ladder is positioned in a tree in a conventional manner, it being understood that the frusto-conical tip 14 facilitates the introduction of the upper end of the ladder in proper position between the branches and foliage of the tree. The fruit picker then climbs the ladder using the rungs 18 to a selected position and picks the fruit from the tree by hand and then deposits it through a selected port onto the baffle 28. As the picking takes place and the fruit is thus deposited, it rolls down the baffle within the column 10 and finally is discharged through the lower discharge port into the discharge spout 30 from which it may be directed into a container C mounted on the hooks 32. In this way there is no forcible dropping of the fruit on any surface and where fruit which is particularly subject to bruising is to be picked, it is preferable that the linings 34 and 36 be employed to cushion the movements of the fruit and avoid injury thereto.

While in the foregoing there has been shown and described the preferred embodiment of this invention, it is to be understood that minor changes in the details of construction combination and arrangement of parts may be resorted to without departing from the spirit and scope of the invention as claimed.

What is claimed is:

1. A fruit harvesting ladder comprising a base member of triangular formation and having a flat horizontally disposed portion provided with a sharp lower edge adapted to bite into the ground to stabilize said ladder, a tubular column carried by and extending upwardly from said base member and having therethrough a plurality of vertically spaced ports, rungs carried by said column circumferentially spaced from said ports and projecting outwardly horizontally on each side of said column, a spirally arranged continuous convolute baffle carried by said column disposed interiorly thereof and providing a gradually descending continuous surface on which fruit may roll downwardly, said ladder having an opening adjacent the bottom thereof constituting an exit through which the fruit is directed and a container secured about said exit for receiving such fruit, and a hollow frusto-conical tip carried by the column adjacent the end thereof remote from the foot to facilitate the projection of the column into a tree between the branches thereof.

2. A harvesting ladder as defined in claim 2 in which said downwardly curved baffle has cushioning means disposed at the lower end thereof for gradually halting the downward movement of such fruit.

References Cited in the file of this patent

UNITED STATES PATENTS

| | | |
|---|---|---|
| 172,976 | Cowles | Feb. 1, 1876 |
| 258,247 | Nicholson | May 23, 1882 |
| 329,668 | Moore | Nov. 3, 1885 |
| 470,515 | Skeels | Mar. 8, 1892 |
| 592,133 | Davis | Oct. 19, 1897 |
| 833,249 | Schwab | Oct. 16, 1906 |
| 1,133,436 | Gramling | Mar. 30, 1915 |

FOREIGN PATENTS

| | | |
|---|---|---|
| 55,498 | Norway | July 29, 1935 |
| 907,893 | France | July 30, 1945 |